(12) United States Patent
Syed et al.

(10) Patent No.: US 7,617,893 B2
(45) Date of Patent: Nov. 17, 2009

(54) METHOD AND SYSTEM FOR DETERMINING FINAL DESIRED WHEEL POWER IN A HYBRID ELECTRIC VEHICLE POWERTRAIN

(75) Inventors: Fazal Syed, Canton, MI (US); Ming Kuang, Canton, MI (US); John Czubay, Troy, MI (US); Matthew Smith, Dearborn Hts., MI (US); Shunsuke Okubo, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 370 days.

(21) Appl. No.: 11/276,491

(22) Filed: Mar. 2, 2006

(65) Prior Publication Data

US 2007/0029119 A1    Feb. 8, 2007

Related U.S. Application Data

(60) Provisional application No. 60/704,648, filed on Aug. 2, 2005.

(51) Int. Cl.
*B60K 6/20* (2007.10)

(52) U.S. Cl. ............ 180/65.21; 160/65.29; 160/65.265; 701/22; 320/132

(58) Field of Classification Search ................ 180/65.1, 180/65.2, 65.3; 903/903, 907, 943
See application file for complete search history.

(56) References Cited

U.S. PATENT DOCUMENTS

| | | | | |
|---|---|---|---|---|
| 4,218,624 A * | 8/1980 | Schiavone | .................... | 290/45 |
| 5,285,111 A * | 2/1994 | Sherman | ...................... | 290/4 C |
| 5,343,970 A * | 9/1994 | Severinsky | ............... | 180/65.25 |
| 5,619,417 A * | 4/1997 | Kendall | ........................ | 702/63 |
| 5,637,987 A * | 6/1997 | Fattic et al. | .................... | 322/40 |
| 5,939,861 A * | 8/1999 | Joko et al. | .................. | 320/122 |
| 6,131,680 A * | 10/2000 | Nii et al. | ................ | 180/65.235 |
| 6,173,574 B1 * | 1/2001 | Obayashi et al. | .............. | 60/710 |
| 6,208,034 B1 * | 3/2001 | Yamaguchi | ................ | 290/40 C |
| 6,269,290 B1 * | 7/2001 | Egami et al. | ................... | 701/22 |
| 6,330,504 B1 * | 12/2001 | Toukura et al. | ............... | 701/54 |
| 6,336,063 B1 * | 1/2002 | Lennevi | ........................ | 701/22 |
| 6,344,732 B2 * | 2/2002 | Suzuki | ........................ | 320/132 |
| 6,364,807 B1 * | 4/2002 | Koneda et al. | .................. | 477/5 |
| 6,401,016 B1 * | 6/2002 | Yoshino et al. | ................ | 701/22 |
| 6,445,247 B1 * | 9/2002 | Walker | ........................ | 330/10 |
| 6,456,041 B1 * | 9/2002 | Terada et al. | ................. | 320/132 |
| 6,490,511 B1 | 12/2002 | Raftari et al. | | |
| 6,553,287 B1 | 4/2003 | Supina et al. | | |
| 6,555,927 B1 | 4/2003 | Suzuki et al. | | |
| 6,662,096 B2 * | 12/2003 | Komiyama et al. | ........... | 701/54 |
| 6,688,411 B2 | 2/2004 | Boggs et al. | | |
| 6,816,759 B2 * | 11/2004 | Kimura | ........................ | 701/22 |
| 2002/0123836 A1 * | 9/2002 | Komiyama et al. | ........... | 701/51 |
| 2003/0094816 A1 * | 5/2003 | Kazama | .................... | 290/40 C |

(Continued)

*Primary Examiner*—S. Joseph Morano
*Assistant Examiner*—Jacob Meyer
(74) *Attorney, Agent, or Firm*—David B. Kelley; Brooks Kushman P.C.

(57) ABSTRACT

A control method and system for a hybrid electric vehicle powertrain is disclosed. A filtered, profiled battery power modifier is used in calculating a final desired wheel power. Unstable battery power oscillations are avoided when a change in driver power demand is made. The effect of engine torque disturbances also is avoided during steady state operation when desired battery power is between limiting charge or discharge values.

23 Claims, 6 Drawing Sheets

U.S. PATENT DOCUMENTS

| | | | |
|---|---|---|---|
| 2004/0006419 A1* | 1/2004 | Kimura | 701/101 |
| 2005/0077867 A1* | 4/2005 | Cawthorne et al. | 320/104 |
| 2005/0080537 A1* | 4/2005 | Cawthorne et al. | 701/51 |
| 2005/0182526 A1* | 8/2005 | Hubbard et al. | 701/1 |
| 2005/0246076 A1* | 11/2005 | Chen et al. | 701/22 |
| 2005/0266957 A1* | 12/2005 | Kamijo et al. | 477/3 |
| 2006/0022642 A1* | 2/2006 | McGee et al. | 320/132 |
| 2007/0021267 A1* | 1/2007 | Obayashi et al. | 477/107 |

* cited by examiner

METHOD AND SYSTEM FOR DETERMINING FINAL DESIRED WHEEL POWER IN A HYBRID ELECTRIC VEHICLE POWERTRAIN

CROSS-REFERENCE TO RELATED APPLICATIONS

This application is based upon U.S. provisional application Ser. No. 60/704,648, filed Aug. 2, 2005. Applicants claim the priority of that provisional application.

BACKGROUND OF THE INVENTION

1. Field of the Invention

The invention relates to a method and system for controlling a hybrid electric vehicle powertrain to maintain battery charging power and battery discharging power within predetermined power limits.

2. Background Discussion

In a typical hybrid electric vehicle powertrain for contemporary automotive vehicles, there are at least two power sources. One power source is an engine, such as an internal combustion engine, and a second source is an electric motor-generator system. A battery, which is a part of the motor-generator system, acts as an energy storing medium. The power sources may operate simultaneously to meet a driver demand for torque at the traction wheels of the vehicle. Examples of powertrains of this type are disclosed in U.S. Pat. No. 6,490,511 (Raftari, et al.); U.S. Pat. No. 6,553,287 (Supina et al.); U.S. Pat. No. 6,555,927 (Suzuki et al.); and U.S. Pat. No. 6,688,411 (Boggs et al.).

A vehicle system controller, when the motor-generator system and the engine operate together, will interpret a driver demand for acceleration or deceleration as a demand for battery charge power or discharge power. The vehicle system controller will coordinate the control of the two power sources and determine how much battery power is needed to meet the driver demand and to achieve a specified vehicle performance with respect to fuel economy, exhaust emission quality and drivability. Controlling battery power so that the battery discharge and charge power limits are not exceeded will maintain battery life. The invention can be used with other hybrid electric vehicle powertrains as well.

In a known technique for protecting battery life in a hybrid electric vehicle powertrain, where the vehicle system controller interacts with the motor, the generator and the engine, desired wheel power is clipped. This is done to maintain system power limits and to ensure that a battery discharge limit and a battery charge limit are not violated. Merely clipping the desired wheel power, however, may not always ensure that the battery charge and discharge power limits are not violated because inaccuracies may occur in engine power estimation during steady state operation and during transients. Further, inaccuracies may occur due to generator and motor transients, steady state losses and rate of change of motor torque and generator torque.

SUMMARY OF THE INVENTION

Inaccuracies in wheel power determination during both transient operation and steady state operation of the powertrain are avoided by the method and system of the invention. The invention, which includes a vehicle system controller, modifies the portion of the wheel power supplied by the battery using a profiling technique such that battery charge and discharge limits are not violated when a change in power at the vehicle wheels is demanded by a driver. If, for example, a driver demand for power is increased during a so-called transient tip-in acceleration event following steady state operation of the powertrain, the demand for battery power will increase at the instant a tip-in is made. The control system at that instant will undertake a profiling calculation of the final wheel power and desired battery power. Without the profiling feature of the invention, the desired battery power will tend to spike instantaneously to an overshoot value above the desired battery power. The spike would be followed by an instantaneous undershoot spike in the calculated desired battery power below the desired battery power. A fluctuation from the peak value to the lower value would be followed by continued fluctuations in the calculated desired battery power until a desired battery power finally is reached in a moderating fashion as the driver demand for power at the wheels is reached.

The profiling feature of the invention will prevent uncontrolled, instantaneous spikes in the desired battery power calculation. This profiling will ensure that battery discharge power limits and battery charging power limits are not exceeded during instantaneous spikes in the desired battery power that would occur without profiling. Profiling improves drivability during both steady state powertrain operation and transient powertrain operation.

The profiled positive desired wheel power should never be greater than the positive desired wheel power and the profiled negative desired wheel power should never be less than the negative desired wheel power. At the same time, however, the control system of the invention will distinguish between steady state events and events characterized by spiked battery power values due to a change in driver power demand. Wheel power clipping is not desired when desired wheel power calculations are made during a transient event if battery power limits would be exceeded only because of the power spikes. The invention will ensure that the profiled desired wheel power keeps decreasing during a tip-out event and keeps increasing during a tip-in event without fluctuations in the calculated battery power.

According to a first embodiment of the invention, a driver demand for power initially is clipped to a value that is within the maximum and minimum system limits. The clipped modified driver demand is subtracted from actual engine power and clipped again so that the discharge and charge power limits of the battery are not violated. This desired battery power then is filtered, clipped to the battery limits and finally subtracted from the desired battery power to calculate a profiled battery power modifier for use in a final wheel power determination.

According to a second embodiment of the invention, the system will avoid allowing fluctuations or perturbations in the actual engine power to affect the profiled battery power used for wheel power determinations when the desired battery power is greater than battery charge power limits and less than battery discharge power limits. It does this by eliminating the effect of actual engine power fluctuations or perturbations from the calculation of a battery power profiling modifier. This is accomplished by adding actual engine power to a desired battery power before profiling occurs. After profiling is done, actual engine power is subtracted from the profiled driver demand for power. That value then is subtracted from the desired battery power in a determination of a battery power modifier used in a final desired wheel power determination.

According to a third embodiment of the invention, the control techniques of the first embodiment and the second embodiment can be combined since their functions are mutually exclusive.

PARTICULAR DESCRIPTION OF AN EMBODIMENT OF THE INVENTION

Figure 1:
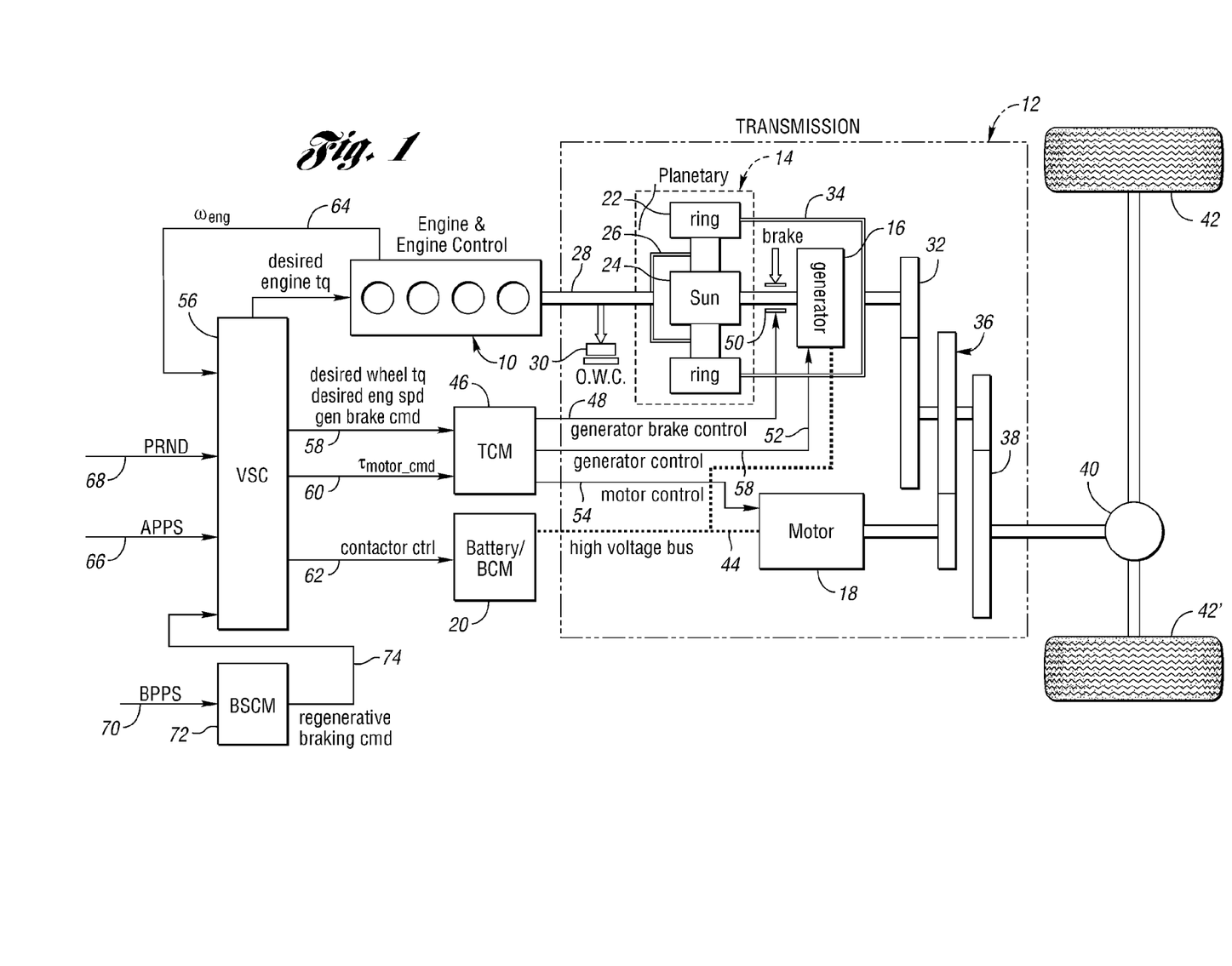
FIG. 1 is a schematic illustration of a split power hybrid electric vehicle powertrain capable of embodying the features of the invention.

FIG. 1 shows a power split hybrid electric vehicle powertrain, which has parallel power flow paths from two power sources to vehicle traction wheels. One power source is an internal combustion engine and the other power source is a generator/motor/battery system. The power flow paths are defined in part by gearing, the engine being connected to one element of the gearing and the generator of the generator/motor/battery system being connected to another element of the gearing.

Although the powertrain schematically illustrated in FIG. 1 is capable of embodying the invention, the invention also could be used in any of a variety of other hybrid electric vehicle powertrains in which an engine power source and an electric power source are used to establish simultaneous power delivery to vehicle traction wheels.

In the embodiment of FIG. 1, numeral 10 generally designates an engine and an engine control, and numeral 12 generally designates a transmission, which includes planetary gearing, shown generally at 14, an electric generator, shown at 16, and an electric motor, shown at 18. The generator 16, the motor 18 and a battery and battery control module 20 define an electric power source that is coordinated with the power source comprising the engine and engine control at 10.

The gearing 14 in the embodiment of FIG. 1 is a planetary gear set comprising a ring gear 22, a sun gear 24 and a carrier with planetary pinions, as shown at 26. The carrier 26 is drivably coupled to the crankshaft of internal combustion engine 10, as shown at 28.

An overrunning coupling 30, which may be optional, can be used to anchor the carrier 26, thereby establishing a reaction torque for the gearing 14.

Torque output gear 32, which is connected to the ring gear by element 34, distributes ring gear torque to countershaft gearing 36. One element of the gearing 36 is connected drivably to a torque output gear 38 for the transmission, whereby torque is delivered through a driveshaft to a geared differential mechanism, schematically shown at 40, for distributing torque to driving axles for traction wheels 42 and 42'.

Motor 18, generator 16 and battery 20 are electrically coupled by a high voltage bus, schematically illustrated at 44.

A transmission control module 46 issues a generator brake control signal, shown at 48, to a generator brake, schematically illustrated at 50, when the transmission is conditioned for power delivery through a fully mechanical torque flow path from the engine 10. The use of brake 50 in the transmission is optional.

The transmission control module 46 also delivers a generator control signal to generator 52 and a motor control signal 54 to the motor 18.

The transmission control module responds to input signals from a vehicle system controller 56. The output signals include a desired wheel torque signal, a desired engine speed signal and a generator brake command, as indicated at 58. A battery and battery control module electrical contactor control signal is indicated at 62.

The vehicle system controller receives input signals, including an engine speed signal, shown at 64, an accelerator pedal position signal, indicated at 66, and a driver range selector signal, shown at 68. The range selector signal 68 indicates a driver's command for park, reverse, neutral or drive.

A brake pedal position signal 70 is received by a brake signal command module 72, which issues a regenerative braking command signal 74 that is received by the vehicle system controller 56.

In the powertrain arrangement of FIG. 1, the battery acts as an energy storage medium for the generator 16 and the motor 18.

Figures 2, 5, 8:
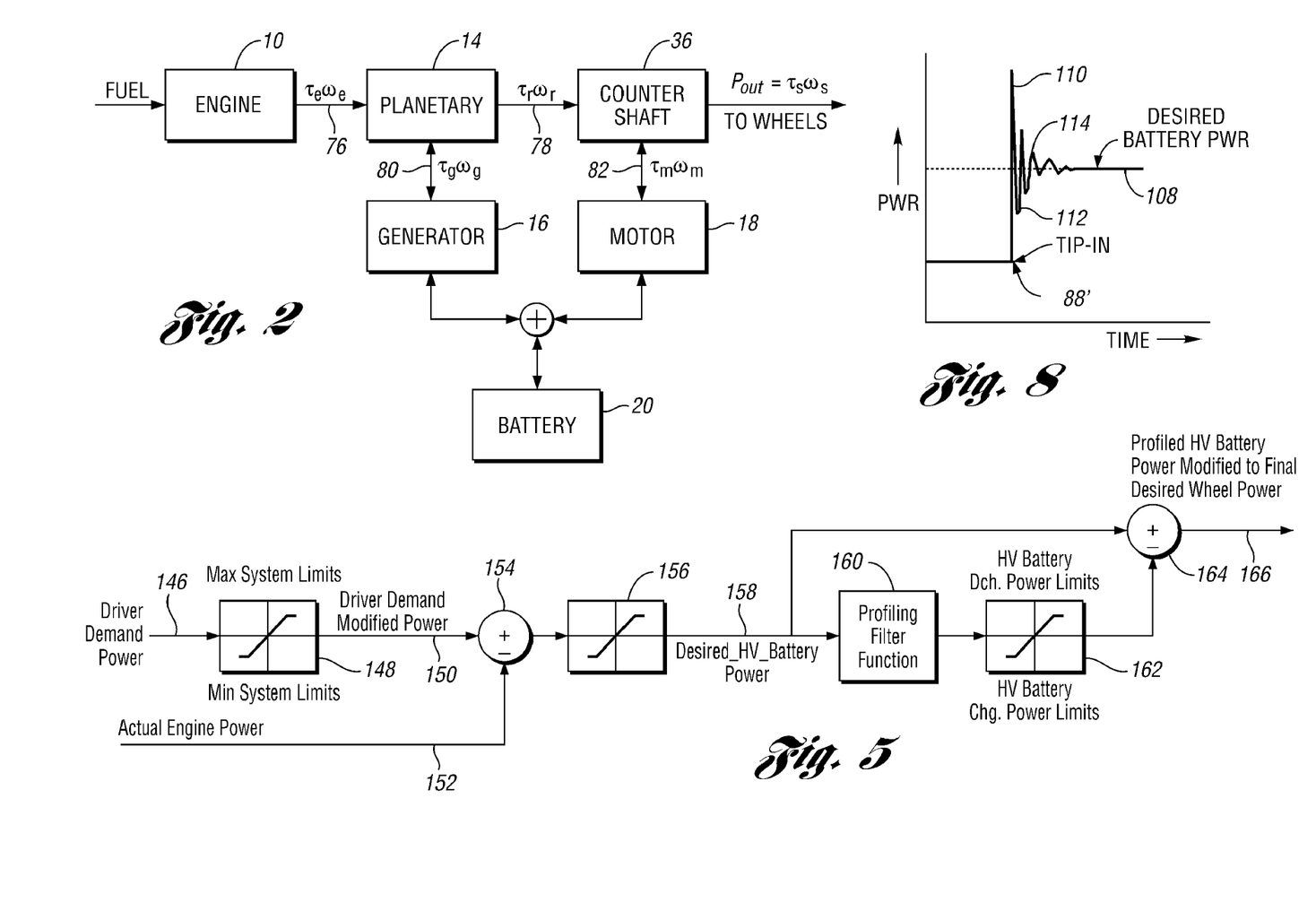
FIG. 2 is a schematic diagram of powertrain power flow for the powertrain illustrated in FIG. 1.
FIG. 5 is a schematic system diagram of a controller for determining a profiled battery power modifier according to a first embodiment of the invention.
FIG. 8 is a time plot showing battery power spikes during a tip-in event as the vehicle driver demands acceleration following steady state vehicle operation when the profiling feature of the invention is not used.

FIG. 2 illustrates schematically the power flow paths for the transmission of FIG. 1 under various operating conditions. Engine output power, shown at 76, is distributed to the planetary gearing, where it can be split into two power flow paths, shown at 78 and 80. The power delivered through the paths 78 and 80 can be controlled by controlling generator speed. The power flow path 78, which is a mechanical power flow path, delivers power from the engine 10 to the carrier 26, to the ring gear 22 and to the power output gear 38 through the countershaft gearing 36. The power flow path 80 is an electrical power flow path as torque is delivered to the generator 16. The power flow path from the motor to the countershaft gearing is shown at 82. The battery 20 is electrically coupled to the generator 16 and the motor 18.

The engine power is split, as explained above, by controlling the engine speed to a desired value. Because of the kinematic property of the planetary gear unit 14, the engine speed figuratively is decoupled from the vehicle speed. The changing generator speed thus will adjust the power output split between the electrical path and the mechanical path.

The control of engine speed results in a generator reaction torque for the engine output torque. This generator reaction torque results in engine output torque distribution to the ring gear of the planetary gear unit 14. This mode of operation can be referred to as a "positive power split."

Because of the kinematic property of the planetary gear unit 14, the generator 16 can rotate in the same direction as the direction of torque that reacts to the engine output torque. In this mode of operation, the generator supplies input power to the planetary gear unit 14 to drive the vehicle. This operating mode is called a "negative power split."

As in the case of the positive power split mode, the generator torque that results from generator speed control reacts against the engine output torque and effects transfer of engine output torque to the wheels. This combination of the generator, the motor and the planetary gear unit functions as an electromechanical, continuously variable transmission (CVT).

When the generator brake 50 is actuated, a parallel operating mode is established since the sun gear 24 is braked and generator braking torque provides a reaction torque for the engine output torque. In this mode of operation, all of the engine output torque is transmitted with a fixed gear ratio to the drivetrain through the mechanical path only. In a power split powertrain system of this type, unlike conventional vehicle powertrains, the engine 10 requires either generator torque resulting from engine speed control or generator brake torque to transmit output power through its electromechanical power flow path or through its mechanical power flow path, respectively, for forward driving motion of the vehicle.

When the electric motor 18 acts as a motor it draws power from the battery 72, thereby driving the vehicle independently of the engine during both forward and reverse operation. This mode of operation is referred to as "electric drive." In addition, the generator can draw power from the battery and drive against the one-way clutch 30 on the engine power output shaft to drive the vehicle in a forward direction when the optional one-way clutch is used. The generator thus can propel the vehicle in a forward direction as it acts as a motor. This mode of operation is called "generator drive."

The two power sources are integrated to work together seamlessly to meet the driver demand for power without exceeding the power limits of the system, including battery limits, while optimizing the total powertrain system efficiency and performance. This requires a coordinated control of the two power sources. That control is achieved by the vehicle system controller 56 that interprets the driver demand, such as the drive range selection and acceleration or deceleration demand, and then determines the wheel torque command based on the driver demand and the powertrain limits. The vehicle system controller 56 determines when and how much torque each power source needs to provide in order to meet the driver power demand and to achieve a specified vehicle performance; i.e., fuel economy, emissions quality, drivability, etc. This requires the vehicle system controller to determine the optimum speed and torque values for the engine.

When there is a change in driver demand for power, such as during a tip-in transient event when the driver demands acceleration, the vehicle system controller 56 will develop a final desired wheel power, as will be explained subsequently with reference to FIGS. 5, 6 and 7.

Figure 3A:
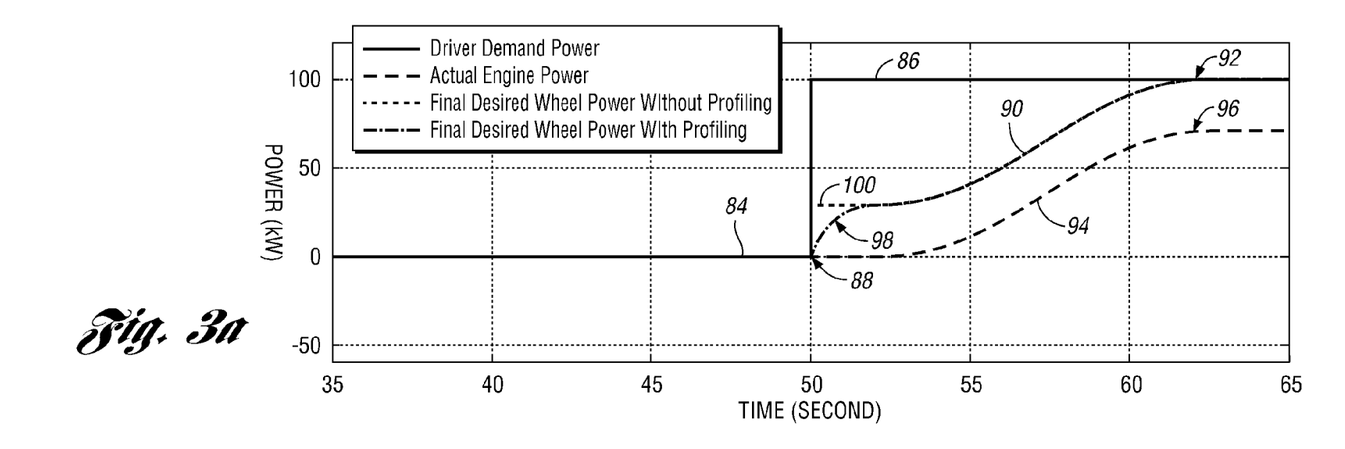
FIG. 3a is a time plot of a driver demand for power, actual engine power, final desired wheel power without profiling and final desired wheel power with profiling during a tip-in event.

The driver demand for power, the actual engine power and the final desired output driving power are plotted schematically in FIG. 3a. The corresponding desired battery power and profiled battery power are plotted in FIG. 3b. In FIG. 3a, the driver demand for power will change from the value shown at 84 during a tip-in transient event as the vehicle accelerates from a standing start. The driver demand for power is increased to the value shown at 86. The vehicle system controller 56, during the 10-second time period following the tip-in event at point 88, will produce a final desired wheel power, as shown at 90. The final desired wheel power will increase until it achieves the driver demanded power at point 92.

The actual engine power during the tip-in event between the points 88 and 92 is shown at 94. The actual engine power will increase until it reaches its steady state value at point 96. The effect of wheel power profiling, as will be explained with reference to FIGS. 5, 6 and 7, is illustrated at 98. The profiling will produce a gradual increase from point 88 until its value merges with the plot shown at 90. If the vehicle system controller were to determine the final desired wheel power without the profiling feature, a substantially instantaneous increase in final desired wheel power would occur, as shown at 100. An instantaneous increase in the wheel power would result in erratic fluctuations in the desired battery power, as will be explained with reference to FIG. 8.

Figure 3B:
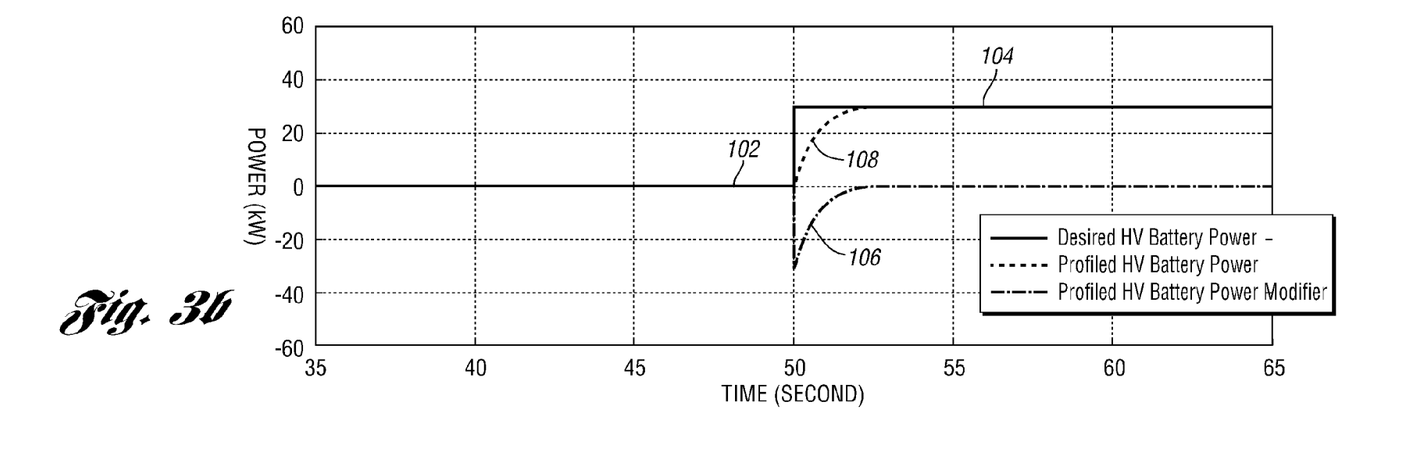
FIG. 3b is a time plot of desired battery power, profiled battery power and profiled battery power modifier during a tip-in event.

The desired battery power during the tip-in event is shown in FIG. 3b. The desired battery power during a tip-in event will increase from a value, shown at 102, to a value, shown at 104. The profiling that results in the plot shown at 98 in FIG. 3a is achieved by calculating a battery power modifier during a tip-in event, as shown at 106 in FIG. 3b. The battery power modifier is subtracted from desired battery power at 104 to produce profiled battery power at 108, as illustrated by the plot in FIG. 3b.

If the profiling described with reference to FIG. 3a is not carried out during a tip-in event, the values for the battery power would fluctuate, as shown in FIG. 8, thereby producing erratic values for the desired battery power, shown at 104. At the instant a tip-in occurs at point 88, the desired battery power will first spike in a positive direction, as shown at 110 in FIG. 8. The desired battery power then would spike in a negative direction, as shown at 112. Oscillations in the desired battery power then would continue, as shown at 114, until the desired battery power at 104' is stabilized. Thus, the profiling of the battery power used for wheel power calculations can improve drivability during a transient tip-in event, while maintaining the battery power within its power limits.

Figure 4A:
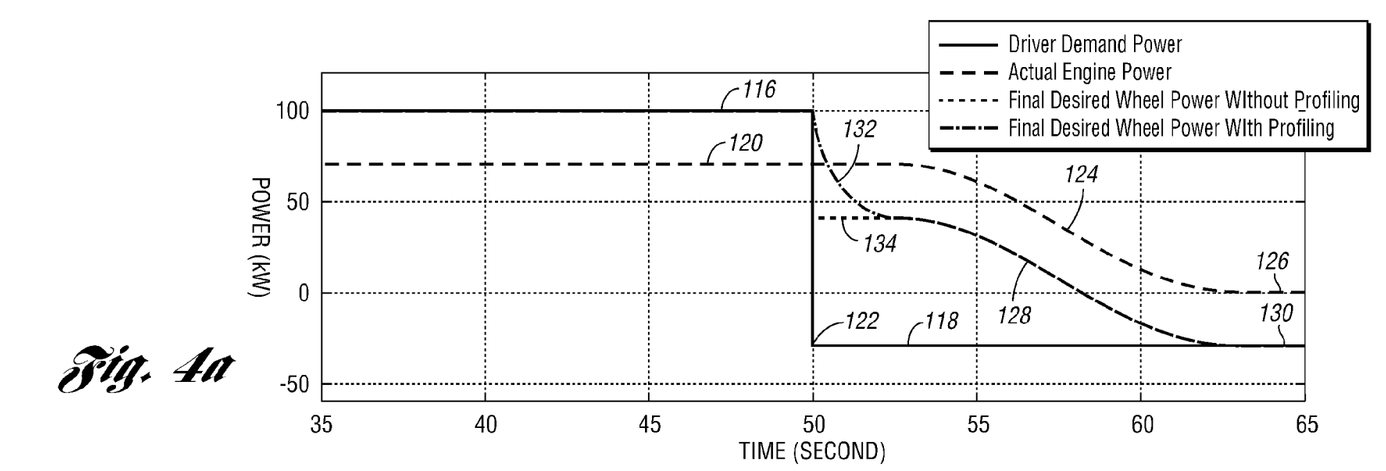
FIG. 4a is a time plot of driver demand power, actual engine power, final desired wheel power without profiling and final desired wheel power with profiling during a tip-in event.
Figure 4B:
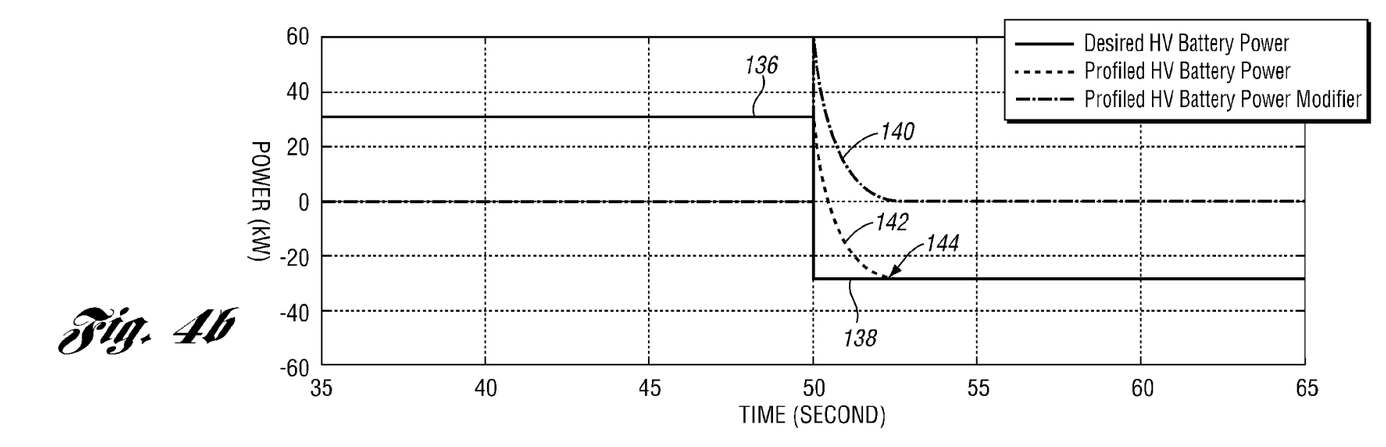
FIG. 4b is a time plot of desired battery power, profiled battery power and profiled battery power modifier during a tip-out event.

FIG. 4a and FIG. 4b are plots that schematically illustrate a typical tip-out event as distinguished from a typical tip-in event. During a tip-out event, a driver demand for power will decrease from a level shown at 116 to a level shown at 118. The actual engine power is plotted at 120. Following a tip-out event that occurs at 122, the actual engine power will gradually decrease, as shown at 124, until a steady state value is reached, as shown at 126.

The final desired wheel power decreases during a tip-out event, as shown at 128, until the final value is reached at 130 upon completion of the tip-out event. If the final desired wheel power is profiled in accordance with the present invention, a gradual decrease in desired wheel power will occur, as shown at 132. On the other hand, if the profiling feature is not present, the desired wheel power would abruptly change from the value shown at 116 to the value shown at 134, which would produce undesired oscillations in desired battery charge power similar to the oscillations described with reference to FIG. 8.

FIG. 4b illustrates changes in battery power during the tip-out event illustrated in FIG. 4a. In FIG. 4b, the desired battery power, prior to the tip-out event, is plotted at 136. Following the beginning of the tip-out event, the desired battery power will decrease to a value shown at 138. Because of the profiling feature of the invention, the desired battery power will gradually decrease, as shown at 142, until it reaches the steady state value at point 144. The profiling is achieved by use of a battery power modifier, which is plotted at 140. The value for the battery power modifier is a result of subtraction of desired battery power at 138 from profiled battery power at 142.

Profiling the battery power used for wheel power calculations will improve drivability during transient events, while controlling battery power to its limits. It is important, however, that the control system should be able to distinguish transient events from steady state events. The desired wheel power can be clipped to the power limits, such that the battery discharge and battery charge limits are not violated. But merely clipping the desired wheel power to the system limits cannot ensure, during steady state operation, that the battery charge and discharge power limits are not violated as a result of inaccuracies in the engine power estimation, due to engine torque fluctuations, changes in generator and motor transient and steady state losses, and the rate of change of motor and generator torques.

The profiled positive desired wheel power should never be greater than the positive desired wheel power, and the profiled negative desired wheel power should never be less than the negative desired wheel power during either steady state events or transient events. The features of the invention that will be described with references to FIGS. 5, 6 and 7 will distinguish between the steady state events and transient events where wheel power clipping is not desired. During such transient events provision is made to ensure that profiled desired wheel power keeps decreasing during a tip-out event or keeps increasing during a tip-in event. This type of profiling will avoid battery power spikes during transient events.

In FIG. 5, the driver demand for power at 146 is clipped so that the maximum system limits and the minimum system limits are maintained, as shown at 148. This results in a modified driver demand for power, as shown at 150. The actual engine power at 152 is subtracted at summing point 154 from the driver demand modified power. That value is again clipped, as shown at 156, to ensure that the maximum battery limits and the minimum battery limits are maintained. This produces a desired battery power value at 158.

The desired battery power is then filtered, as shown at 160. The filtered value is clipped to maintain the battery discharge power limits and the battery charge power limits, as shown at 162. The clipped battery power value is subtracted at summing point 164 from the desired battery power to produce the profiled battery power modifier for the wheel power determination, as shown at 166. Whenever the driver demand results in a desired battery power clipped to either the battery charge or discharge limits, the profiled battery power or desired wheel power ensures that the battery limits are not violated.

The profiling filter function at 160 uses a second order filter with a constant that is related to motor speed. The filter has two variables, a time constant and damping rate. This is indicated in FIG. 3c. Motor speed is an indicator of vehicle speed. The values in FIG. 3c for motor speed are expressed in radians per second, and the filter constants are vectors of constant value. The vector values of FIG. 3c are empirically determined to achieve desired profiling during calibration of the system. If the filter is a first order filter, a single scaler constant (e.g., $K_1$) would be used. If the filter is not a first order filter (e.g., second, third, ... ), the scaler constant would be equal to $K_1 \ldots K_n$, where "n" is defined as the order of the filter.

If the desired battery power is between the charge and discharge limits (i.e., less than the discharge limit and greater than the charge limit), any changes in the actual engine power will tend to affect profiled battery power used for wheel power modification. This can result in a slightly degraded vehicle drivability. Under these conditions the modified system of FIG. 6 can be used to determine a profiled battery power modifier for use in the determination of the final desired wheel power. In the system of FIG. 6, the driver demand for power at 168 is clipped, as shown at 170, to the maximum and minimum system limits. The clipped modified driver demand for power at 172 is distributed to summing point 174 where the actual engine power is subtracted from the modified power demand. The power demand then is clipped at 176 to the discharge and charge power limits, thereby determining the desired battery power at 178.

Figures 3C, 6:
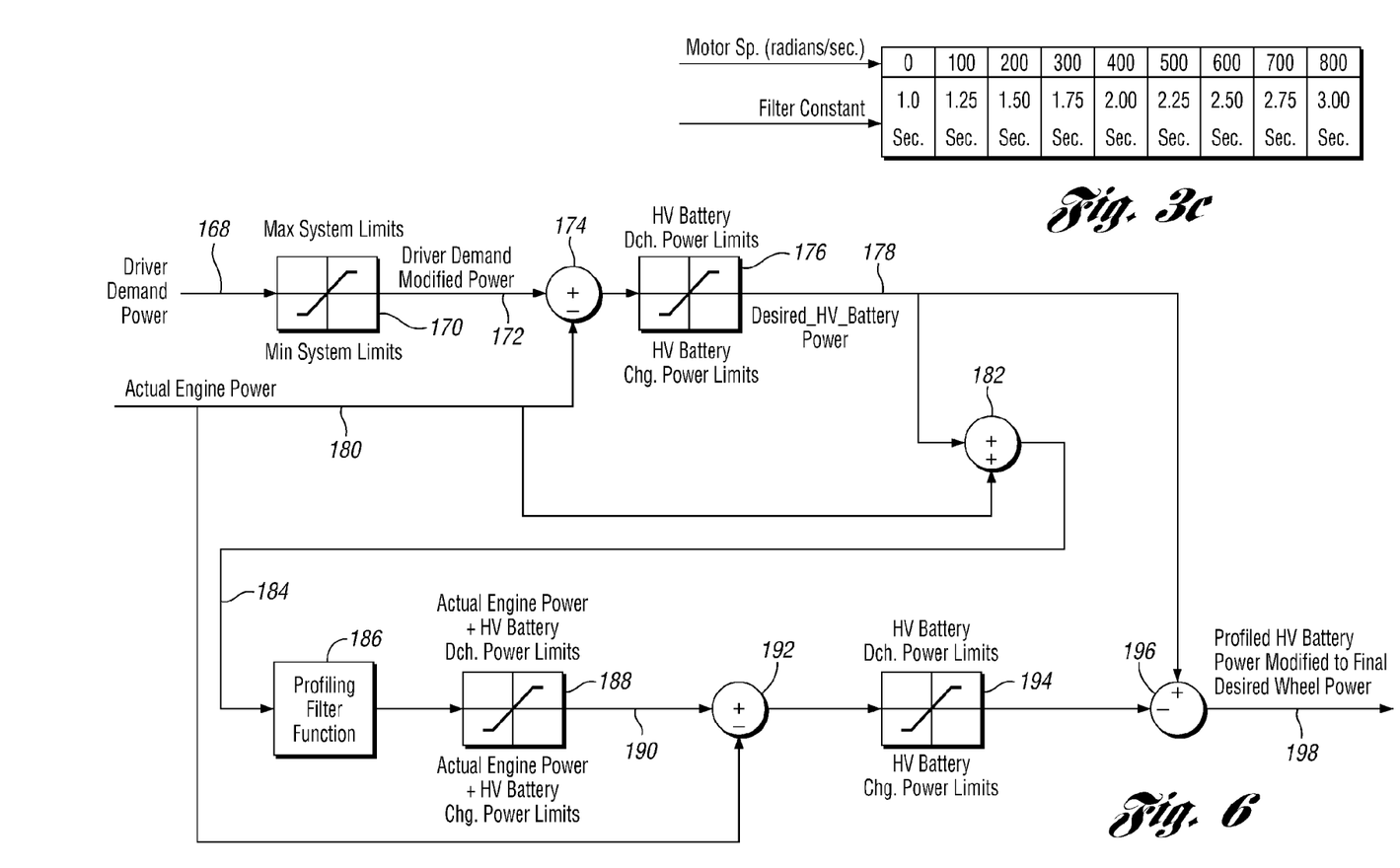
FIG. 3c is a table showing the relationship of vehicle (motor) speed to a filter constant used in executing a profiling function.
FIG. 6 is a schematic system diagram of a controller for determining a profiled battery power modifier according to a second embodiment of the invention.

Unlike the system of FIG. 5, the system of FIG. 6 will not allow changes in the actual engine power to affect profiled battery power used for wheel power modification, which would result in degraded vehicle drivability. The system of FIG. 6 achieves this feature by adding actual engine power at 180 to the desired battery power at summing point 182. The resulting power is distributed, as shown at 184, to a profiling filter function circuit at 186. The filtered value for power is clipped at 188 to produce a modified profiled value at 190. The power value is clipped at 188 to actual engine power plus the battery discharge limits, and actual engine power plus the battery charge limits. The actual engine power at 180 then is subtracted from the modified profiled value at summing point 192. This value then is clipped at 194 to the battery charge and discharge limits, which results in a profiled battery power modifier for use in estimating wheel power. The profiled battery power is subtracted at 196 from the desired battery power at 178.

It is possible, when the driver demand results in a desired battery power that is clipped to either the battery charge limit or the battery discharge limit, for the profiled battery power to be affected by actual engine power variations or perturbations during the calculation of the profiled battery power modifier at 198, which again could result in a slight performance degradation. To avoid this condition, the modified system of FIG. 7 can be used. The system of FIG. 7 combines functions of the system of FIG. 5 and the functions of the system of FIG. 6 so that an accurate battery power modifier can be calculated when the driver demand results in battery power clipped to the battery charge and discharge limits, as well as when a desired battery power is within the battery charge and discharge limits.

The system of FIG. 5 performs the profiling function perfectly without any undesired battery power profiling modifier when the driver demand results in desired battery power that is clipped to either the battery charge limit or the battery discharge limit. Under all other conditions, when the driver demand results in a desired battery power between the discharge and charge limits, an undesirable battery power profiling modifier can result. On the other hand, the system of FIG. 6 performs profiling perfectly without any undesired battery power profiling modifier when the driver demand results in desired battery power between discharge and charge limits. Under the condition when the driver demand results in desired battery power clipped to either the battery charge or discharge limit, the system of FIG. 6 can result in an undesired battery power profiling modifier.

The function of FIG. 5 and the function of FIG. 6 are mutually exclusive. One system can be used under a first set of conditions and the other system can be used under a second set of conditions. A combination of the functions of FIGS. 5 and 6 in the system of FIG. 7 thus is feasible under all conditions. Any change in actual engine power will not result in an undesired profiled battery power modifier.

Figure 7:
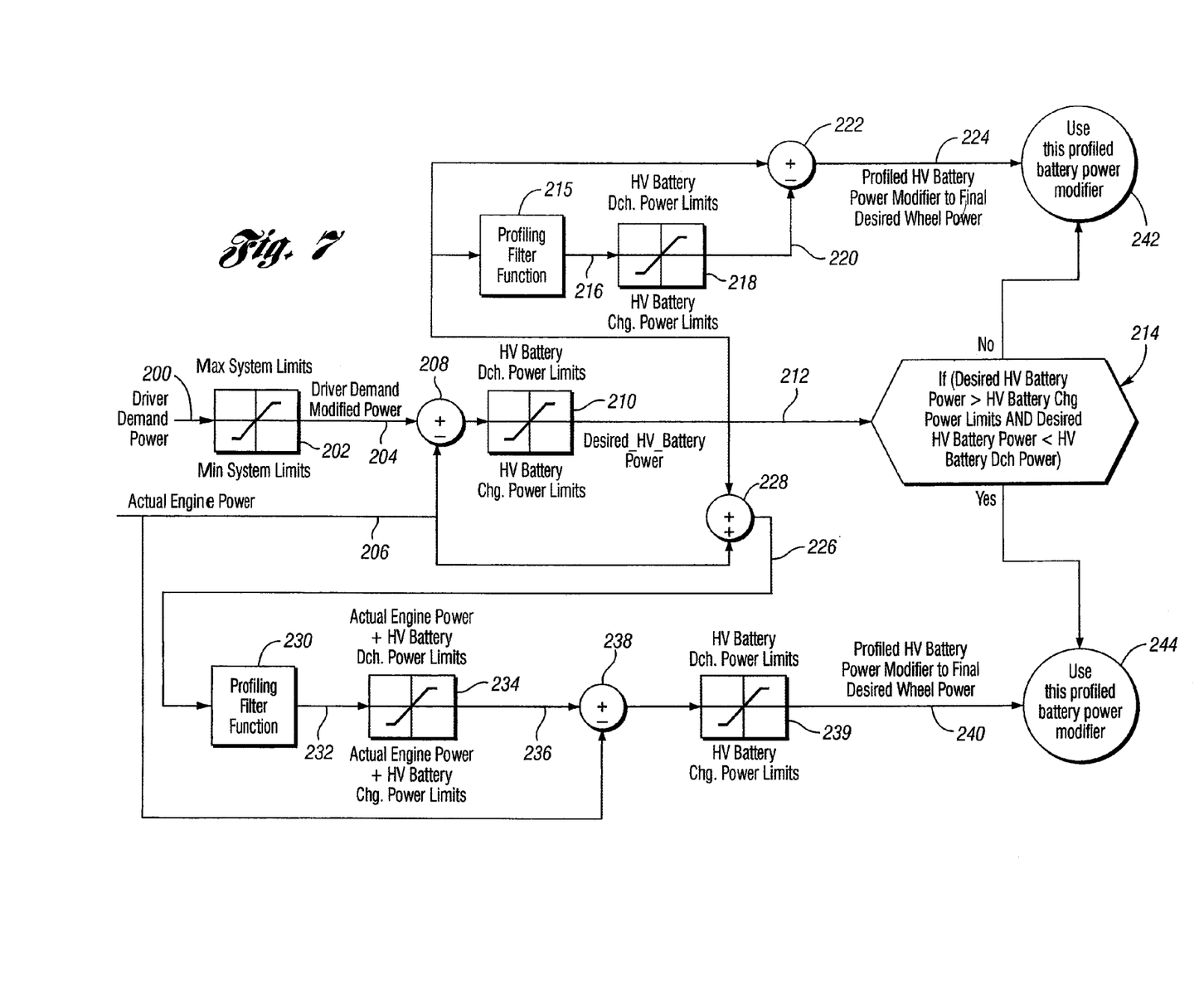
FIG. 7 is a schematic system diagram of a controller for determining desired battery power modifier according to a third embodiment of the invention.

In the system of FIG. 7, a driver demand for power at 200 is clipped at 202 to ensure that the system limits are not violated. The desired modified driver demand for power at 204 and the actual engine power at 206 are combined at summing point 208, where the actual power is subtracted from the modified power demand. The result of the combination of the actual engine power with the modified driver power demand is clipped at 210 to ensure that the battery discharge and charge power limits are not violated. The desired battery power at 212 is distributed to logic circuit 214.

The desired battery power at 212 is distributed to a profiling filter function circuit at 215. The filtered desired battery power value at 216 is clipped, as shown at 218. The desired battery power value at 212 is subtracted from the clipped battery power at 220. This is done at summing point 222. Concurrently with the determination of the profiled battery power modifier at 224, the system of FIG. 7 will add the actual engine power at 206 to the desired battery power at 212 to produce a power value at 226. This addition occurs at summing point 228. The value for power at 226 then is filtered at filtering circuit 230.

The filtered value at 232 is clipped to the actual engine power plus battery discharge power limit, and to the actual engine power plus battery charge power limit, as shown at 234. This produces a profiled power demand value at 236. Actual engine power then is subtracted at summing point 238 from the demand power at 236. Thus, the actual engine power that is added at 228 is subtracted at 238. After the battery power is clipped, the desired battery power is subtracted from the clipped battery power, as shown at 239. A profiled battery power modifier is produced at 240.

It is apparent from FIG. 7 that two profiled battery power modifiers are computed simultaneously. Either one or the other is used by the vehicle system controller depending upon the value of the desired battery power. This decision is made at logic block 214. It is determined at logic block 214 whether the desired battery power is greater than the battery charge power limits and whether the desired battery power is less than the battery discharge power limits. If the result of that inquiry is negative, the profiled battery power modifier determined at 224 is used. This is indicated at 242 in FIG. 7. On the other hand, if the inquiry at 214 is positive, the vehicle system controller will use the profiled battery power modifier at 240. This is indicated at 244 in FIG. 7.

Although embodiments of the invention have been described, it will be apparent to persons skilled in the art that modifications may be made without departing from the scope of the invention. All such modifications and equivalents thereof are intended to be within the scope of the invention as defined by the following claims.

What is claimed:

1. A control method for determining a desired wheel power in a hybrid electric vehicle powertrain having an engine power source and an electric power source that includes a battery, an electric generator and an electric motor, one power source complementing the other to meet a driver demand for power at the vehicle wheels, the control method comprising the steps of:

measuring a driver demand for power and measuring actual engine power;

subtracting actual engine power from the driver demand for power to determine desired battery power;

filtering the desired battery power using a calibrated filter function to obtain a filtered desired battery power; and subtracting from the desired battery power the filtered desired battery power to obtain a profiled battery power modifier for use in determining a final desired wheel power.

2. The control method set forth in claim 1 wherein the driver demand for power is clipped to maximum and minimum system power limits to produce a modified driver demand for power.

3. The control method set forth in claim 1 wherein the desired battery power is clipped to prevent the desired battery power from exceeding battery charge and discharge power limits.

4. The control method set forth in claim 1 wherein the filtered desired battery power is clipped to prevent the battery discharge and charge power from exceeding battery charge and discharge power limits.

5. The control method set forth in claim 1 wherein filtering is accomplished using a calibrated filter function in a table of functions with a filter variable dependent upon vehicle speed.

6. A control method for determining a desired wheel power in a hybrid electric vehicle powertrain having an engine power source and an electric power source that includes a battery, an electric generator and an electric motor, one power source complementing the other to meet a driver demand for power at the vehicle wheels, the control method comprising the steps of:

measuring a driver demand for power and measuring actual engine power;

subtracting actual engine power from the driver demand for power to determine desired battery power;

adding actual engine power and the desired battery power;

filtering the sum of the actual engine power and the desired battery power using a calibrated filter function to produce a profiled filtered sum of actual engine power and desired battery power;

subtracting the actual engine power from the profiled filtered sum of actual engine power and desired battery power; and subtracting from desired battery power the difference between the profiled filtered sum of actual engine power and desired battery power and the actual engine power to produce a profiled battery power modifier for use in determining final desired wheel power.

7. The control method set forth in claim 6 wherein the demand for power is clipped to maximum and minimum system power limits to produce a modified demand for power.

8. The control method set forth in claim 6 wherein the desired battery power is clipped to prevent the desired battery power from exceeding battery charge and discharge limits.

9. The control method set forth in claim 6 wherein the filtered sum of the actual engine power and the desired battery power is clipped to limit the sum of the desired battery power and actual engine power.

10. The control method set forth in claim 6 wherein the difference between the filtered sum of the desired battery power and the actual engine power is clipped to values within the battery charge and discharge limits.

11. The control method set forth in claim 6 wherein the calibrated filter function is a table function with a filter variable dependent upon vehicle speed.

12. A control method for determining a desired wheel power in a hybrid electric vehicle powertrain having an engine power source and an electric power source that includes a battery, an electric generator and an electric motor, one power source complementing the other to meet a driver demand for power at the vehicle wheels, the control method comprising the steps of:

measuring a driver demand for power and measuring actual engine power;

subtracting the actual engine power from the driver demand for power to determine desired battery power;

filtering the desired battery power using a calibrated filter function to obtain a filtered desired battery power;

subtracting from the desired battery power the filtered desired battery power to obtain a first profiled battery power modifier for use in determining a final desired wheel power;

adding the actual engine power and the desired battery power;

filtering the sum of the actual engine power and the desired battery power using a calibrated filter function to produce a profiled sum of desired battery power and actual power;

subtracting the actual engine power from the profiled sum of desired battery power and the actual engine power to produce a second profiled battery power modifier for determining final desired wheel power;

selecting the second profiled battery power modifier when the desired battery power is greater than a battery charge power limit and is less than a battery discharge power limit; and selecting the first profiled battery power modifier when the desired battery power is less than the battery charge power limit and is greater than the battery discharge power limit.

13. The control method set forth in claim 12 wherein the calibrated filter function is a table function with a filter variable dependent on vehicle speed.

14. The control method set forth in claim 12 wherein the driver demand for power is clipped to maximum and minimum system power limits.

15. The control method set forth in claim 12 wherein the desired battery power is clipped to the battery charge and discharge limits.

16. The control method set forth in claim 12 wherein the filtered desired battery power is clipped to the battery charge and discharge limits.

17. The control method set forth in claim 12 wherein the sum of actual engine power and desired battery power is clipped to the battery charge and discharge limits.

18. The control method set forth in claim 12 wherein the difference between the driver demand for power and the actual engine power is clipped to the battery charge and discharge limits.

19. A control system for a powertrain for a wheeled hybrid electric vehicle having an engine power source and an electric power source that includes a battery, an electric generator and an electric motor, one power source complementing the other to meet a driver demand for power at vehicle wheels, the system comprising:

a controller for measuring a desired battery power by subtracting actual engine power from a driver demand for power; and a filtering circuit for profiling desired battery power and subtracting the profiled desired battery power from the desired battery power whereby a profiled battery power modifier is developed for use in determining a final desired wheel power.

20. A control system for a powertrain for a wheeled hybrid electric vehicle having an engine power source and an electric power source that includes a battery, an electric generator and an electric motor, one power source complementing the other to meet a driver demand for power at vehicle wheels, the system comprising:

a controller for measuring a driver desired battery power by subtracting actual engine power from the driver demand for power; and a filtering circuit for profiling the desired battery power;

the controller being configured further for subtracting the profiled desired battery power from the desired power, the difference between the profiled desired battery power and the desired battery power determining a profiled battery power modifier.

21. A control method for operating a hybrid electric powertrain during a transient event in which a change in driver demand for power occurs, the powertrain having an engine and a battery cooperatively arranged to deliver driving power to a driven element of the powertrain, the method comprising the steps of:

delivering a portion of the demanded power using the engine;

supplementing the power delivered by the engine with a controlled amount of power from the battery;

computing a battery power modifier; and modifying transient battery power delivery changes using the battery power modifier at the instant of a change in driver power demand.

22. A control method for operating a hybrid electric powertrain having an engine and a battery cooperatively arranged to deliver driving power to a driven element of the powertrain, the method comprising the steps of:

delivering a portion of demanded power using the engine;

supplementing the power delivered by the engine with a controlled amount of battery power;

detecting transient engine torque fluctuations during steady state operation of the powertrain; and modifying power delivered from the battery during instantaneous engine torque fluctuations whereby battery power delivery limits are not exceeded during steady state operation.

23. A control system for a powertrain for a wheeled hybrid electric vehicle having an engine power source and an electric power source that includes a battery, an electric generator and an electric motor, one power source complementing the other to meet a driver demand for power at vehicle wheels, the system comprising:

a controller configured to determine a driver desired battery power; and a filtering circuit for profiling the desired battery power whereby a profiled desired battery power is obtained;

the controller being configured further for subtracting the profiled desired battery power from the desired battery power, whereby the difference between the profiled desired battery power and the desired battery power determines a profiled battery power modifier to modify battery power fluctuation during a change in driver power demand.

\* \* \* \* \*

UNITED STATES PATENT AND TRADEMARK OFFICE
CERTIFICATE OF CORRECTION

PATENT NO.      : 7,617,893 B2                      Page 1 of 1
APPLICATION NO. : 11/276491
DATED           : November 17, 2009
INVENTOR(S)     : Syed et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this

Nineteenth Day of October, 2010

David J. Kappos
*Director of the United States Patent and Trademark Office*